May 19, 1931.  J. H. WAGENHORST  1,806,227
METHOD OF MAKING WIRE SPOKED WHEELS
Filed Feb. 10, 1930  2 Sheets-Sheet 2
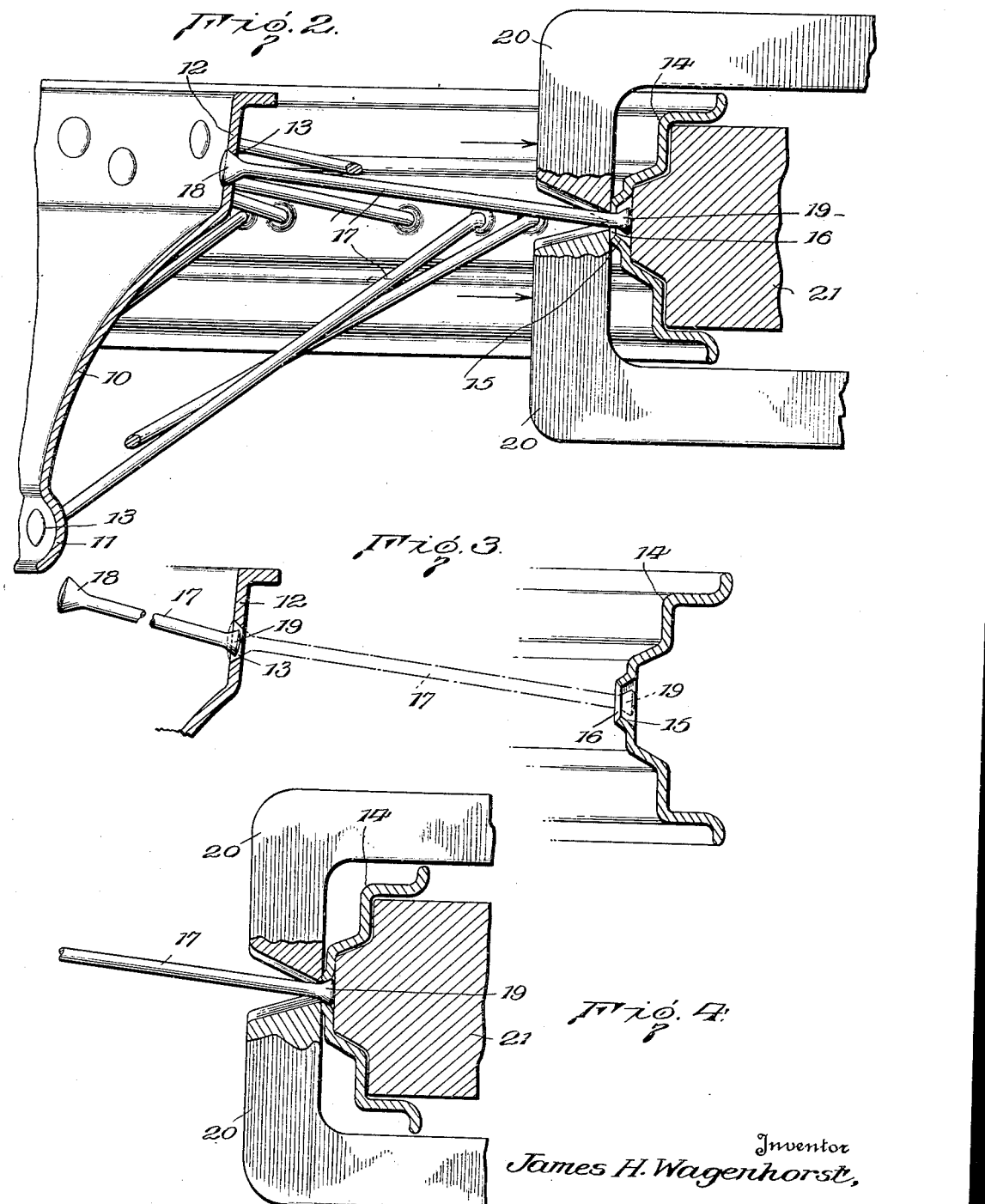

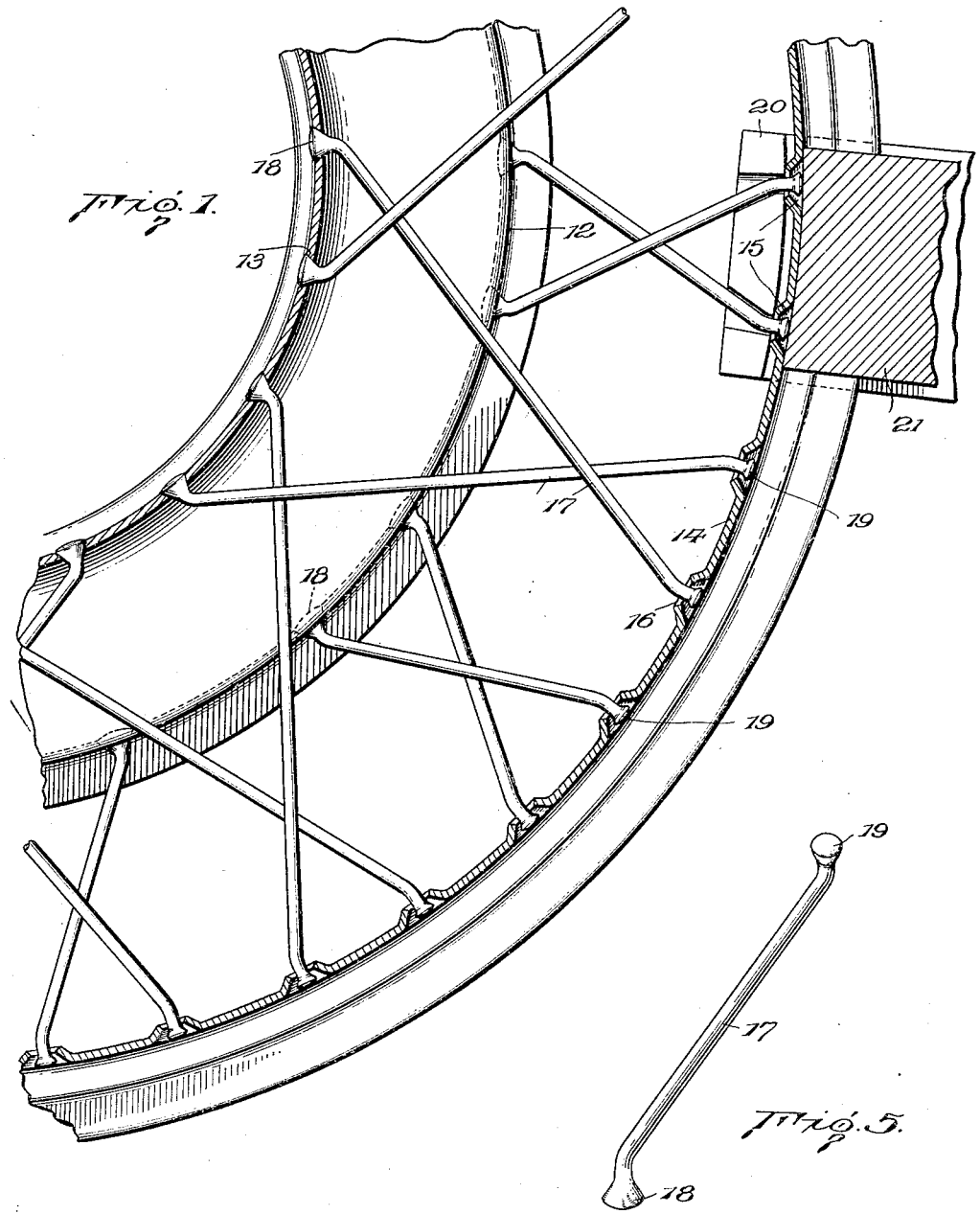

Patented May 19, 1931

1,806,227

UNITED STATES PATENT OFFICE

JAMES H. WAGENHORST, OF DETROIT, MICHIGAN

METHOD OF MAKING WIRE SPOKED WHEELS

Application filed February 10, 1930. Serial No. 427,350.

My invention relates to an improved method of making wire spoked wheels, and has to do, more particularly, with an improved method for making wire spoked wheels of the demountable type customarily employed on automobiles.

The object of my invention is to provide a method by which stronger wire spoked wheels may be made more cheaply and efficiently than by methods heretofore known and used.

A further object of my invention is to provide a method of making wire spoked wheels which will permit of the use of spokes of high carbon steel, which have been previously heat treated and tempered so as to fit them for the tension strains to which they will be subjected in use.

A further object of my invention is to provide a method of making wire spoked wheels by which the spokes will be simultaneously anchored and tensioned.

Further objects, and objects relating to details and economies of operation will definitely appear from the detailed description to follow. In one instance, I accomplish the objects of my invention by the means described in the following specification. My invention is clearly defined and pointed out in the appended claims. My method is illustrated diagrammatically, in the accompanying drawings, forming a part of this specification, in which Figure 1 is a sectional view through a portion of a wheel hub and rim showing the preheaded spokes assembled, but prior to the anchoring of such spokes, Fig. 2 is a similar view showing several anchored spokes and a spoke in assembled position with the metal of the rim about to be deformed into engagement with the head on the outer end of the spoke to anchor and tension same, Fig. 3 is a fragmentary view showing the mode in which a spoke is placed for assembly with the hub and rim.

Fig. 4 is a sectional view through the wheel rim shown in Fig. 2 subsequent to the anchorage of the spoke, and Fig. 5 is a perspective view of one of the preheaded spokes.

In the drawings, the same reference numerals refer to the same parts throughout the several views.

For many years, wire wheels were made using spokes having heads on the inner ends thereof and screw threaded outer ends which received nipples screwed on the spokes to anchor and tension them. The spokes were assembled by passing them through the spoke holes in the hub until their outer ends projected into the spoke holes in the rim and then applying the nipples from the outer side of the rim and screwing them on the outer ends of the spokes. This method of construction permitted the use of spokes of high carbon steel, which had been suitably heat treated, but was very slow and expensive because each spoke had to be independently tensioned by screwing up the nipple threaded on the outer end thereof. This meant that the tensioning of a wire wheel was a matter of repeated trial and adjustment, which had to be done by expensive manual labor. In recent years, many wire wheels have been constructed in which the screw threaded nipples were eliminated and the outer ends of the spokes were upset, after assembly of the wheel, to form heads engaging the outer face of the rim to anchor the spokes in position. This required that the spokes should be made of low carbon steel and they could not be heat treated or tempered before assembly, because they had to be soft enough to permit the upsetting to form heads. Consequently, wheels so constructed are not as strong as they should be, since the spokes are not of the sort best fitted for taking the tension strains imposed on them in service.

In general, my invention consists in employing spokes which are preheaded, that is, which have heads formed on both ends thereof prior to their assembly in the wheel. Such spokes can be formed of high carbon steel and can be suitably heat treated and tempered so as to fit them for taking tension strains. I prefer to form a larger head on one end of the spoke than on the other. The hub and rim members are provided with spoke holes which are larger than the smaller heads on the spokes, so that the spokes can be assembled by passing them, small end first, through the spoke holes in hub and rim. I propose to press the metal adjacent the spoke holes in hub or rim against the smaller heads on the spokes, thereby anchoring the spokes in position and tensioning them. Of course, the smaller heads may be on either the inner or outer ends of the spokes, but, due to the greater simplicity of operation, I prefer to provide the smaller heads on the outer ends of the spokes. In such case, I assemble the spokes by inserting the smaller heads through the spoke holes in the hub and passing the spokes outwardly until the larger heads seat in the hub and the smaller heads pass through the spoke holes in the rim. Then, I depress or deform the metal of the rim surrounding the spoke holes into engagement with the heads on the outer ends of the spokes, thereby anchoring the spokes, and, at the same time, tensioning them. During this operation, the rim is preferably held true to size circumferentially by a contracting rim or band surrounding it.

Referring to the numbered parts of the drawings, and more particularly Fig. 2, I provide a hub 10 with portions 11 and 12 in which the spoke holes 13 are formed. I also provide the rim 14 with depressions 15 in which the spoke holes 16 are formed. The rim is made of low carbon steel, so that it can easily be deformed, or refashioned, by means of dies. I form a plurality of spokes 17, as in Fig. 5, each having a large head 18, on one end, and a smaller head 19 on the other. Thus, preheaded spokes may be made of high carbon steel and may be suitably heat treated and tempered prior to assembly. The perforated hub is first assembled in the proper relation to the perforated rim. The spokes are then assembled by inserting the small heads 19 through the spoke holes 13, and passing the spokes outwardly until the small heads 18 pass through the proper spoke holes 16 in the rim, as shown in Figs. 1, 2 and 3. I then press outwardly the metal of the rim depressions 15, surrounding the spoke holes 16, into engagement with the spoke heads 19, as shown in Figs. 2 and 4, thus anchoring the spokes and tensioning them at the same time. This may be accomplished by suitable dies 20 engaging the inner face of the rim, which dies may be pressed outwardly against the inner face of the rim by suitable mechanism, not shown, acting in the direction of the arrows shown in Fig. 2. During this operation, a block 21 is preferably applied to the outer face of the rim, so as to hold it true to circumferential size and prevent it from being distorted by the pressure applied by the dies 20. The rim should be held under slight compression during the process of forcing the metal of the rim against the heads of the spokes to anchor and tension them so that when the block 21 is released the rim will tend to expand slightly. Of course, the rim should not be compressed beyond its elastic limit, but should be compressed slightly within the elastic limit so as to get a better tensioning effect when it expands, after the spokes have been anchored in place and the fixture which engages the outer face of the rim has been removed. The dies 20 exert pressure radially outward to press the metal of the rim against the heads on the outer ends of the spokes to anchor the spokes, and this pressure also puts the spokes under tension. This is an important feature of my invention, since, in a wire-spoked wheel, the spokes act in tension and should be initially tensioned in the assembly of the wheel.

It will be observed that I have provided a very effective method of making wire-spoked wheels, by which strong wheels can be made more cheaply and quickly, using spokes of the proper material and characteristics to withstand the tension strains to which such spokes are subjected in use. The spokes are set in place, anchored and tensioned simultaneously, and, if desired, all the spokes can be anchored and tensioned at a single operation by means of dies engaging the entire inner face of the rim throughout its circumference. However, this is not essential as the spokes can be anchored and tensioned by several successive operations performed at different points along the circumference of the rim, as desired. A characteristic feature of my invention is that the metal of the hub or the rim, or both parts, is pressed against heads formed on preheaded spokes to anchor such spokes in position. I have shown the spokes assembled by passing them outwardly through the hub to final position, and then pressing the rim base against the smaller heads on the outer ends of the spokes. The assembly might be made by passing the spokes inwardly through the rim to proper position, and forcing the metal of the hub against smaller heads on the inner ends of the spokes. Again, the heads on both ends of the spokes might be smaller than the spoke holes in hub and rim, and the spokes might be inserted by passing the inner ends and then the outer ends through the corresponding spoke hole sand then pressing the metal of both hub and rim against heads on both ends of the spokes.

I am aware that the method herein disclosed may be changed considerably without departing from the spirit of my invention, and, therefore, I claim my invention broadly as indicated by the appended claims.

What I claim is:

1. The method of making wire-spoked wheels which comprises assembling a hub member within a rim member, inserting spokes through holes formed in said hub and rim members, anchoring said spokes in one of said members with their free ends extending through the holes of the other member, and pressing the metal which bounds the holes in the latter member to contract each hole in order to grasp the spoke end inserted therethrough and also pressing said metal radially outwardly to tension the spoke thus grasped.

2. The method of making wire-spoked wheels comprising the assembling of a hub within a rim, inserting spokes headed on both ends through holes formed in hub and rim, and pressing the metal of the rim surrounding the holes therein outwardly into contact with the heads on the outer ends of the spokes to securely anchor said spokes.

3. The method of making wire-spoked wheels comprising the assembling of a hub provided with spoke holes within a rim also provided with spoke holes, the formation of spokes with heads on both ends, one head being smaller than the other, the passing of said spokes through the spoke holes in the hub until the larger heads engage the inner face of the hub and the smaller heads have passed through the spoke holes in the rim, and pressing outwardly the metal of the rim adjacent the spoke holes into engagement with said heads to securely anchor the spokes.

4. The method of making wire-spoked wheels comprising the assembling of a hub, provided with spoke holes, within a rim, also provided with spoke holes, passing pre-headed spokes through the spoke holes in the hub outwardly until their ends project through the spoke holes in the rim, and pressing the metal of the rim adjacent the spoke holes into contact with the outer ends of the spokes to securely anchor said spokes.

5. The method of making wire-spoked wheels comprising the formation of spokes with large heads on one end and small heads on the other, forming in a hub spoke holes larger than said small heads, forming in a rim spoke holes larger than said small heads, assembling said hub within a rim, passing spokes outwardly through the spoke holes in the hub until the outer ends thereof pass through the spoke holes in the rim, and pressing the metal of the rim surrounding said spoke holes into contact with said small heads to anchor and tension the spokes.

6. The method of making wire spoked wheels comprising the assembling of a hub provided with perforated depressions within a rim likewise provided with perforated depressions, the forming of spokes headed on both ends and with smaller heads on one end than the other, passing said spokes outwardly through the perforated depressions of the hub until the smaller heads pass through the perforated depressions of the rim, and pressing the metal of said rim depressions against the smaller heads to anchor and tension the spokes.

7. The method of making wire-spoked wheels comprising the assembling of a hub within a rim, inserting spokes headed on both ends through holes formed in hub and rim, holding the rim true to size circumferentially, and pressing the metal of the rim surrounding the the holes therein outwardly into contact with the heads on the outer ends of the spokes to anchor and tension said spokes.

8. The method of making wire-spoked wheels comprising the assembling of a hub member, provided with spoke holes, within a rim member also provided with spoke holes, forming spokes with heads on both ends thereof, passing said spokes through said holes, and pressing the metal of one of said members, adjacent the spoke holes, against the corresponding heads of the spokes to anchor and tension said spokes.

9. The method of making wire-spoked wheels comprising the assembling of a hub, provided with spoke holes, within a rim, also provided with spoke holes, the formation of spokes with heads on both ends, one head being smaller than the other, the passing of said spokes through the spoke holes in the hub until the larger heads engage the inner face of the hub and the smaller heads have passed through the spoke holes in the rim, holding the rim true to size circumferentially, and pressing outwardly the metal of the rim adjacent the spoke holes into engagement with said heads to anchor and tension the spokes.

10. The method of making wire-spoked wheels comprising the formation of spoke holes in a rim member, the formation of spoke holes in a hub member, the formation of heads on both ends of spokes, the assembly of hub member, rim member and pre-headed spokes with said spokes positioned in said spoke holes, and deforming the metal of one of said members to securely anchor the spokes.

11. The method of making wire-spoked wheels comprising the formation of spokes headed on both ends, the assembly of a perforated hub within a perforated rim with said pre-headed spokes positioned in the perforations of hub and rim, and deforming the metal of the rim to anchor and tension the spokes.

JAMES H. WAGENHORST.